Figure 1:
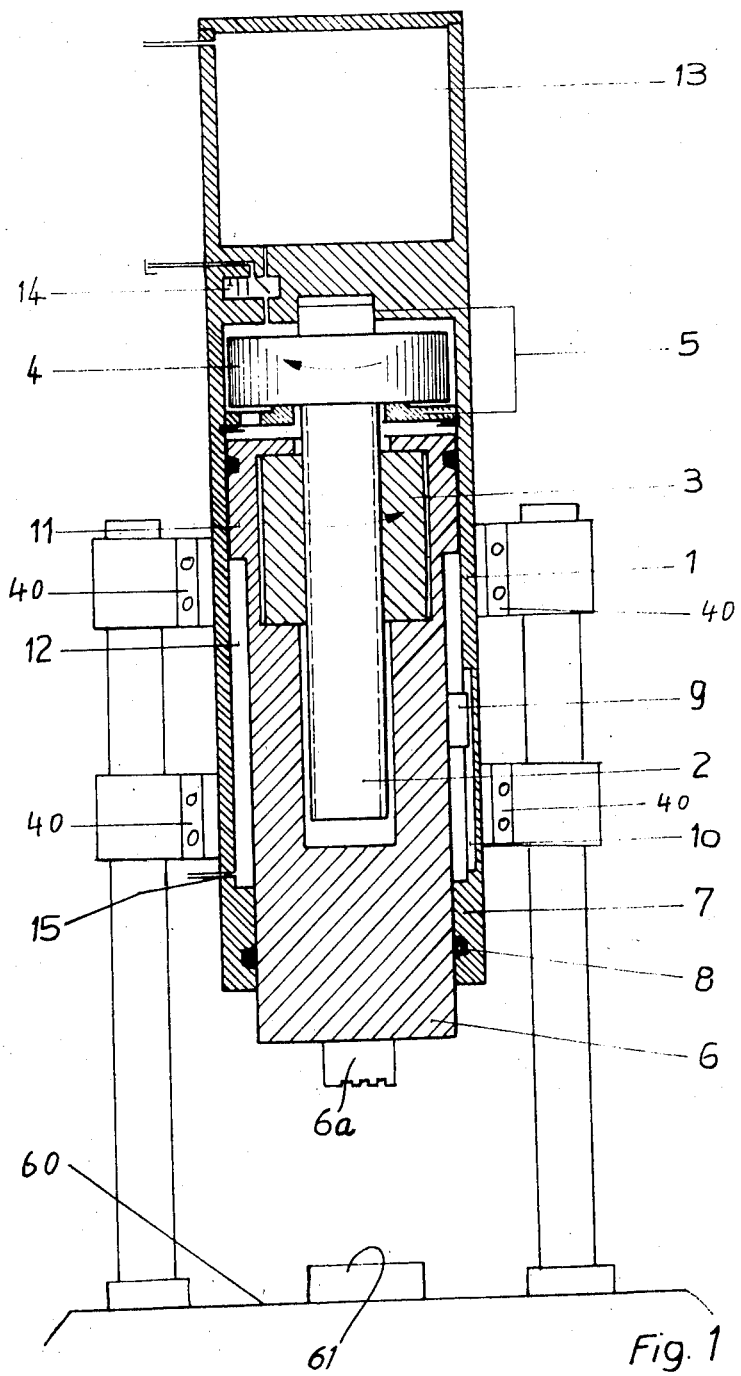

United States Patent
Dischler

[15] 3,654,799
[45] Apr. 11, 1972

[54] PRESS ASSEMBLY

[72] Inventor: Helmut Dischler, Am Kreuzfeld, Germany

[73] Assignee: Becorit Grubenausbau GmbH, Recklinghausen, Germany

[22] Filed: Feb. 20, 1970

[21] Appl. No.: 13,103

[30] Foreign Application Priority Data

Mar. 1, 1969 Germany...................P 19 10 507.8

[52] U.S. Cl.................................................72/454, 100/289
[51] Int. Cl. ...........................................................B21j 9/12
[58] Field of Search....................72/454, 453, 435, 436, 429; 100/289

[56] References Cited

UNITED STATES PATENTS

| | | | |
|---|---|---|---|
| 3,376,728 | 4/1968 | Nemessanyi | 72/454 |
| 3,426,574 | 2/1969 | Voronak | 72/454 |
| 1,076,931 | 10/1913 | Zeh | 72/454 |
| 1,913,663 | 6/1933 | Ferris | 72/454 |
| 3,482,463 | 12/1969 | Huydts | 100/289 |

Primary Examiner—Charles W. Lanham
Assistant Examiner—Gene P. Crosby
Attorney—Berman, Davidson and Berman

[57] ABSTRACT

A sheet metal working or other press is operated say pneumatically. Movement of the press moves a freely rotatable screw relative to a freely rotating nut of a screw-and-nut mechanism so both spin in opposite directions storing energy which is released when the movement of the press is arrested during deformation of the workpiece. Either the screw or nut moves with the movable part of the press and the other is immovable in a casing. No rotary impact couples are transmitted to the frame of the machine when the press is arrested.

8 Claims, 2 Drawing Figures

INVENTOR:
HELMUT DISCHLER,

PRESS ASSEMBLY

The invention concerns an assembly for a press.

The type of press concerned is that where a movable press tool is mounted on a support possibly in the form of a spindle.

The invention aims at providing an improved form of assembly or means for carrying the movable press tool.

In conventional fly presses the spindle forms a screw of a screw and nut mechanism and is usually connected to a fly-wheel or fly-bob which is rotated rapidly during the working stroke of the press and thereby stores rotational energy. When the upper movable tool strikes against the workpiece, the rotation of the fly-wheel is arrested, the rotational energy stored in the fly-wheel is converted into available metal-working energy by the screw and nut mechanism.

Such presses produce a powerful rotary impact when the upper tool comes into contact with the workpiece, as a result of the arresting of the fly-wheel rotation which impact is transmitted through longitudinal guides to the housing and/or the frame of the screw press. The magnitude of this rotary impact depends on the mass ratio between the fly-wheel and the non-rotating parts of the assembly, on the abruptness of the arrest and on the energy originally supplied to the fly-wheel.

In order to minimise this rotary impact presses having oppositely rotating inertial energy stores have been developed.

One such press has an axially displaceable, non-rotatable screw which is provided over a portion of its length with a right-hand thread and over a portion of its length with a left-hand thread. Two freely rotatable nuts having considerable rotational inertia mounted axially undisplaceable on a frame of the process engage in these threads. The screw is subjected to an axial force by which the two nuts are oppositely rotated. When the upper tool which is carried rigidly by the screw strikes the workpiece, the screw and therefore the rotary movements of the two oppositely rotating nuts are arrested, the rotational energy stored in the two nuts being transmitted to the workpiece.

Complete elimination of the rotary impact is achieved only if the oppositely rotating nuts and the speed of rotation are exactly synchronised with each other and the cost of constructing this press is relatively high, since two threads and corresponding nuts are required for each press and these threads and nuts are heavily subjected to wear and tear. Moreover, the screw must necessarily be twice as long as the stroke of the press.

In other presses a screw and a nut are counter rotated to operate the press. Again elimination of the rotary impact is possible only if the screw and nut and the speeds of rotation are exactly synchronised with each other. The cost of construction is very high, since a separate drive is provided for the screw and for the nut.

The present invention provides an assembly for mounting a movable press tool for movement relative to a stationary press tool in a press, comprising a support for said movable press tool, a casing in which said support is axially slidable, means for moving said support axially in the casing and the improvement residing in a screw and nut mechanism in the casing, both the screw and nut being rotatable relative to the casing and one of these being axially movable with said support and the other axially fixed.

Due to the freely rotatable mounting both of the screw and the nut, said screw and said nut rotate on each working stroke, i.e., when a relative axial movement between screw and nut occurs. The two directions of rotation are opposed to each other. When the upper tool strikes the workpiece, the relative axial movement of screw and nut stops and the rotation of the screw and the nut is arrested. Both the rotational energy in the screw and the nut are converted into energy available to perform work on the workpiece.

The rotary impacts which occur during the retardation of the rotation of the screw on the one hand, and of the nut, on the other hand, are substantially equal to each other and compensate each other, because they are in opposite directions. The moments of inertia of the screw and of the nut, on the other hand need not be equal, since the rotary impact produced by the retardation of rotation is directly proportional to the product of the angular velocity and the moment of inertia whilst the angular velocities of the screw, on the one hand, and of the nut on the other hand, adjust themselves during the working stroke to a ratio relatively to each other, corresponding to the inverse ratio of the two moments of inertia. Consequently, compensation of the rotary impact is substantially perfect in each case, and it is immaterial how large the two oppositely rotating rotational moments are. This is specially advantageous, because, no special attention needs be taken in manufacture synchronising ensure synchronizing of the screw and nut. It may be advisable to select the moments of inertia of the screw and of the nut to be approximately of the same order of magnitude in order to minimise the effects of friction and windage.

According to another preferred embodiment of the present invention, either the screw or the nut is connected to an axially displaceable piston of a hydraulic or pneumatic cylinder. By this means it is extremely simple to obtain the longitudinal movement of the screw and/or of the nut. It is preferable for the piston to be capable of being loaded with pressure medium at both ends in order to return the piston longitudinally back to the starting position after the working stroke. The cylinder is preferably a compressed air cylinder. The use of compressed air as the pressure medium has the advantage that very rapid piston movements can be executed without undesirable pressure surges occurring in the pressure supply system as would be the case with liquids. Furthermore, lubricants for the moving parts can be directly added to the compressed air. In addition, the compressed air can be discharged into the atmosphere so that a return system for the pressure medium is unnecessary.

The assembly is preferably provided with a cylindrical housing. This cylindrical housing may serve, if required as a compressed air cylinder for applying force to the longitudinally displaceable parts, over a portion of its length. This results in a very compact construction of the assembly allowing the assembly to be fitted to divers different processing machines without having to change its construction. This is advantageous particularly in mass production.

The cylindrical housing is preferably provided on its outer circumference with brackets serving to connect it to a base or fixed tool support.

It may also be an advantage if the movable tool support acts as a piston in a portion of the cylindrical housing of the press assembly which serves as a hydraulic or pneumatic cylinder. In this case the nut is preferably mounted within a piston-like upper section of the upper tool support which is also provided over a portion of its length with an axial bore serving to receive the screw which is axially immovable. This reduces the overall height of the assembly.

According to another embodiment of the press, the nut is mounted in a bearing on the inner wall of the cylindrical housing, whilst the axially displaceable screw is connected by push-and-pull couplings (i.e. rotational couplings), to and between an axially displaceable piston and the axially displaceable movable tool support. The screw is stressed only in compression and not simultaneously in compression and torsion when the movable tool strikes the workpiece.

Two embodiments of the present invention are described hereinafter in greater detail with reference to the accompanying drawings.

IN THE DRAWINGS

Figure 2:
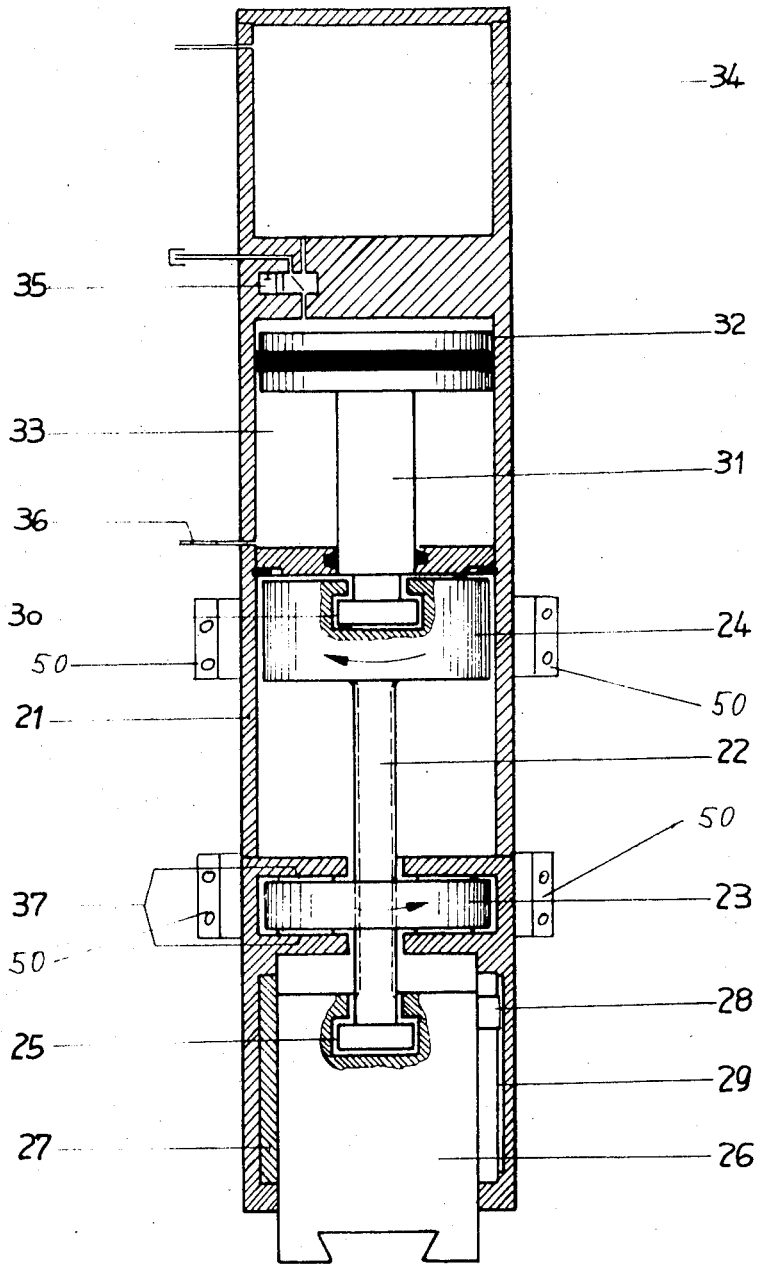

FIG. 1 is an axial section of a press incorporating an assembly according to the invention having an axially immovable screw, FIG. 2 is an axial section of a second form of a press assembly having an axially immovable nut.

A screw 2 and a nut 3 are arranged in a cylindrical housing 1 of a press top assembly. The screw is provided on its outer circumference with a steep thread (not shown). This thread engages in a corresponding thread on the inner wall of the bore of the nut 3. The screw 2 is connected at its upper end with a fly-wheel 4 which is rotatably movable in a bearing 5, but which cannot move axially.

Arranged in the lower part of the cylindrical housing 1 is a tool support 6 which is cylindrical and longitudinally displaceable in a slide guide 7 to project from the lower end of the cylindrical housing 1 and which serves to support the upper movable press tool 6a. The slide guide 7 is provided with a sealing ring 8 between the support 6 and the inside of the cylindrical housing 1. The upper tool support 6 is provided in its centre longitudinal area also with one or more sliding springs 9 displaceable in longitudinal grooves 10 formed on the inner circumference of the cylindrical housing 1 and the length of which corresponds to the length of the working stroke. The sliding springs 9 and grooves 10 serve to prevent rotation of the upper tool support 6.

At its upper end 11 the upper tool support 6 is formed as a piston slidably sealed in a hydraulic cylinder section 12 of the cylindrical housing 1. The nut 3 is journalled to rotate in the upper piston-like end of the tool support 6 so that the nut is axially undisplaceable relatively to the upper tool support 6, but axially displaceable relatively to the housing 1 and screw 2.

At the upper end of the cylindrical housing 1 is a cylindrical compressed air chamber. This chamber 13 is connected through a control valve 14 to a space of the housing 1 in which the fly-wheel 4 is mounted. In turn, this space communicates with the annular space of the piston 11. The supply of pressure medium to the piston 11 is therefore effected by way of the bearing containing space of the housing 1 in order to enable continuous lubrication of this bearing 5 with lubricants added to the compressed air. Another compressed air pipeline 15 is attached to the annular space between the upper tool support 6 and the housing 1, through which the lower annular surface of the piston 11 is acted on by compressed air when the piston 11 is to return to its starting position after the working stroke.

The press shown in FIG. 1 operates as follows:

Initially the top surface of the piston 11 is exposed to compressed air by a suitable adjustment of the control valve 14. The piston 11 is thus pushed down in the hydraulic cylinder section 12 of the housing, so that a relative axial displacement takes place between the screw 2 and the nut 3. Due to the thread, both the nut 3, and (the screw 2 and the fly-wheel 4 mounted on said screw), are set rotating in opposite directions. The speeds of rotation of the nut 3 and screw 2 are a function of the moments of inertia thereof. Both in the screw 2 and in the nut 3 rotational energy is stored during the downward motion of the piston 11.

When the upper tool strikes the workpiece, the longitudinal movement of the upper tool support 6 and of the nut 3 connected thereto is retarded. At the same time the rotations of the screw 2 and fly-wheel 4, as also of the nut 3 are arrested, the stored rotational energy being converted into energy available for deforming work on the workpiece. Since the rotary impulses of the screw and the fly-wheel 4 and of the nut 3 are equal but oppositely directed, there is substantially no resultant rotary impact. The turning moments (torques) occurring during the retardation act exclusively on the thread of the screw 2 and/or the nut 3 and cannot be transmitted to the housing 1, since both the screw 2 and the nut 3 are freely rotatable.

In order to return the piston 11 of the upper tool support 6 and the nut 3 to their starting position, the annular lower surface of the piston 11 is acted on by compressed air from the compressed air pipeline 15. During the return of the piston 11 to its starting position, the pressure chamber above the piston 11 communicates with the atmosphere by the reversing of the control valve 14. The annular lower surface of the piston 11 can also be permanently supplied with compressed air through the pipeline 15, so that the compressed air in the annular space between the housing wall and the upper tool support 6 has the effect of a return spring.

In the embodiment shown in FIG. 2, a screw 22 and a nut 23 are arranged in a cylindrical housing 21. The screw 22 is provided at its upper end with a fly-wheel 24 and is axially displaceable in the housing 21. It is connected at its lower end by a pull and push coupling to a movable upper tool support 26 which in turn is longitudinally displaceable in a slide guide 27 provided on the lower end of the housing 21. Similarly to the embodiment described with reference to FIG. 1, the upper tool support 26 is secured by sliding springs 28 and grooves 29 from rotating in the housing 21.

Above the fly-wheel 24 on the screw 22 is another pull-and-push coupling 30, by means of which the screw 22 is connected to a piston rod 31 of a piston 32 longitudinally guided in an upper hydraulic cylinder section 33 of the cylindrical housing 21.

A pressure medium storage space 34, which communicates with the pressure chamber above the piston 32 through a control valve 35, is arranged above the housing 21.

A compressed air pipeline 36 communicates with the annular space below the piston 32, by means of which pipeline the piston 32 can be returned.

The screw 22 is journalled to rotate freely both in the couplings 25 and 30 but is constrained by these couplings to the same axial movements as the tool support 26 and the piston 32. The nut 23 is however axially undisplaceably but freely rotatably journalled in a bearing 37.

The embodiment of the present invention described with reference to FIG. 2 operates as follows:

The piston 32 is loaded with compressed air by suitable actuation of the control valve 35. The piston 32 is thus depressed and displaces the spindle 22 and the upper tool support 26 in an axial direction until the upper tool engages the workpiece. As a result of the relative axial displacement between the screw 22 and the nut 23, both the screw 22 with the fly-wheel 24 thereon and the nut 23 are set rotating by the thread on the screw 22, once again in opposite directions. Similarly as described already with reference to FIG. 1 rotational energy is also stored in this case and is converted into translatory energy by arresting the rotation when the upper tool engages the workpiece. The compensation of the rotary impact in the arresting of the rotation is effected in this case similarly as already described with reference to FIG. 1.

For returning the longitudinally displaceable parts the piston 32 is loaded with compressed air through the pipeline 36 in this embodiment also, the pressure space above the piston 32 communicating through the control valve 35 with the atmosphere.

Brackets 40 and 50 are also provided on the outside of the cylindrical housing 1 (FIG. 1) and 21 (FIG. 2), by means of which brackets the press top can be connected to the lower part 60 of the press on which the lower tool 61 is mounted.

I claim:

1. An assembly for mounting a movable press tool relative to a stationary press tool in a press comprising
   a support for said movable press tool, a casing in which said support is axially slidable,
   drive means acting on said support to move it axially in the casing, and a screw and nut mechanism in the casing, one of the screw and the nut being axially movable with said support and the other axially fixed the improvement residing in both the screw and nut being rotatable relative to the casing so that when said support is axially displaced by the drive means both the screw and the nut rotate but in opposite senses.

2. An assembly according to claim 1 wherein the means is a piston and cylinder.

3. An assembly according to claim 2 having compressed air supply means.

4. An assembly according to claim 2 wherein said piston and cylinder is double acting.

5. An assembly according to claim 2 wherein said means are formed integrally with said support.

6. An assembly according to claim 1 wherein the nut is rotatable in said means but axially immovable therein and a fly-wheel is connected to the screw which is axially immovable relative to the casing.

7. An assembly according to claim 1 wherein the fly-wheel is journalled for rotation but not for axial movement in a chamber of the casing through which compressed air carrying a lubricant is to flow to operate said means.

8. An assembly according to claim 1 wherein the nut is rotatable but axially immovable in the casing and the screw is axially immovable relative to the support but free to rotate relative thereto and wherein the screw has connected thereto a fly-wheel.

* * * * *